United States Patent
Wilt

[11] 3,745,552
[45] July 10, 1973

[54] INTRUSION SIGNATURE DETECTOR REQUIRING BOTH FREQUENCY AND AMPLITUDE SHIFTS

[75] Inventor: Marvin Duane Wilt, Dallas, Tex.

[73] Assignee: Teledyne Industries, Inc. (Geotech Division), Dallas, Tex.

[22] Filed: Sept. 13, 1971

[21] Appl. No.: 179,641

[52] U.S. Cl............. 340/261, 340/258 R, 340/276
[51] Int. Cl. ............................................. G08b 13/00
[58] Field of Search................. 340/261, 276, 258 R; 329/147, 135; 325/476, 474, 316

[56] References Cited
UNITED STATES PATENTS

| | | | |
|---|---|---|---|
| 3,573,817 | 4/1971 | Akers.................................. | 340/276 |
| 2,731,520 | 1/1956 | Richardson.......................... | 340/261 |
| 3,068,470 | 12/1962 | Werner et al. ..................... | 340/258 R |
| 2,730,896 | 1/1956 | Boisblanc........................... | 340/261 |
| 3,543,261 | 11/1970 | Burney................................ | 340/261 |
| 3,261,009 | 7/1966 | Stetten et al..................... | 340/258 R |
| 3,696,369 | 10/1972 | Laymon et al...................... | 340/261 |

*Primary Examiner*—John W. Caldwell
*Assistant Examiner*—Glen R. Swann, III
*Attorney*—Arthur E. Dowell, Jr. et al.

[57] ABSTRACT

An intrusion detector system which uses a geophone to sense both ambient environmental events and man-made cultural events, the system being responsive to the combination of changes both in the amplitude and in the frequency of the waveform signature picked up by the geophone to detect intrusions characterized by man-made events superimposed upon ambient events. An AM detector channel responds to changes in amplitude of the geophone output waveform, and an FM discriminator channel responds to shifts in its momentary frequency, these latter shifts being stored both in a long-term integrator and in a short-term integrator whose contents are continuously compared to determine when short-term conditions begin changing as compared with averaged long-term conditions, the latter representing mainly environmental noise. When at the same time both channels respond beyond certain preset threshold levels the system delivers outputs, and these outputs can either directly set off alarms or else a certain number of outputs can be counted before an alarm results thereby tending to reduce the liklihood of false alarms.

2 Claims, 3 Drawing Figures

INVENTOR
MARVIN DUANE WILT

INTRUSION SIGNATURE DETECTOR REQUIRING BOTH FREQUENCY AND AMPLITUDE SHIFTS

This invention relates to intrusion detector systems, and more particularly to improved systems which are responsive to the simultaneous detection of both amplitude changes and frequency changes in information taken a transducer to determine the existence of an intrusion.

It is a major object of this invention to provide an intrusion detection system which uses standard AM (amplitude modulation) and FM (frequency modulation) detection circuitry to provide a reliable and relatively inexpensive system having a low false-alarm rate.

BACKGROUND

It has been recognized in the past that usually natural or environmental noise provides a waveform having charatceristics which are different than waveforms resulting from man-made or cultural events. My copending patent application entitled "Intrusion Detector" and filed May 12, 1970, Ser. No. 36,603 now U.S. Pat. No. 3,686,658 recognizes more specific differences between environmental and cultural events, and uses the fact that in the presence of only environmental noise the frequency and therefore the rate of zero-axis crossings will be relatively higher than the over-all frequency and number of zero-axis crossings when such noise has superimposed upon it man-made events of the type to which the present system is especially sensitive, for example, the tramping of feet on the ground, or the rumble of a vehicle thereover. When the latter type of instrusion occurs, the lower frequency components resulting from man-made events superimposed upon the higher frequency ambient noise components will tend to displace the latter away from the zero-axis except in the vicinity of the former's zero-axis crossings thereby lowering the dominant composite frequency. This fact is also used in the present disclosure in combination with amplitude sensing techniques to provide reliable waveform signature recognition. The system responds to simultaneous changes in two major characteristics of a seismic waveform signature being continuously picked up by a vibration transducer such as a geophone, these characteristics being amplitude and frequency. The normal background level of environmental noise as picked up by a geophone on the earth's surface is characterized by a relatively constant average amplitude level having a frequency distribution that tends to remain fairly uniform over a period of time. Cultural activity in the area tends not to severely change the long-term frequency distribution, but considered on a short-term basis cultural activity tends to dominate the frequency distribution by introducing lower frequency components which not only lower the short-term composite frequency, but simultaneously tend to increase its amplitude.

SUMMARY OF INVENTION

The system includes a geophone delivering its output signal into an amplifier having a long period AGC (automatic gain control). The amplifier has sufficient gain to raise the geophone signal to a useable level and to maintain the average signal level substantially continuously. On the other hand, the time constant of the AGC is chosen to provide at least a few seconds delay so as to prevent short-term variations in the gain of the amplifier which would otherwise eliminate intermittent cultural events which the amplifier is intended to pass. A time constant of a few seconds duration will be sufficient to preserve its transient response while still allowing the system to adapt to long-term changes, for instance as between night and daytime noises or changing weather conditons, such as wind. On the other hand, the time constant of the AGC amplifier is long enough so that short-term responses produced by present intrusions are not averaged out, but are passed by the amplifier to the AM channel and the FM channel of the system, respectively. The output of the amplifier is then processed in these two channels, the channels seeking to determine when there is a simultaneous increase in the amplitude level accompanied by a downward shift in frequency at the output of the amplifier, both changes exceeding certain preset levels.

It is a more specific object to provide as part of the combination of this invention an amplitude channel including an AM detector for detecting the instantaneous amplitude envelope, a low pass filter to eliminate therefrom frequencies which are above the range of interest, and a threshold detector which seeks to determine whether the instantaneous amplitude level as demodulated and filtered exceeds a certain preset level. Recalling for the moment that the AGC amplifier initially establishes an average level but cannot change its gain quickly, it follows that short-duration increases in the amplitude of the geophone signal will be passed by the AGC amplifier and will be demodulated as instantaneous increases in signal level in the AM channel. Those short-duration increases in amplitude which exceed the preset threshold level are then delivered as output from the AM channel to a delay circuit whose purpose will be discussed hereinafter during the discussion of the FM channel.

It is the further object to provide as part of the present combination a frequency channel which includes an FM discriminator whose voltage output is a function of the instantaneous frequency of the input signal, i.e., the dominant spectral component thereof at any particular time. In the presence of background noise only, this channel normally indicates a relatively high frequency input. However, in the presence of cultural events the dominant frequency shifts downwardly, thereby changing the output voltage which is delivered by the FM discriminator. This output voltage goes to two separate integrators, one of which integrates the average output level of the FM discriminator over a relatively long-term, and the other of which integrates the output of the FM discriminator over a short-term. Thus, instantaneous excursions in the dominant input frequency will tend to affect the short-term integrator level considerably but will have very little effect upon the long-term integrator output. On the other hand, in the absence of intermittent cultural events, both integrators will tend to have the same integrated levels. Thus, the occurrence of cultural events which cause a considerable shift in the dominant frequency spectrum detected by the FM discriminator will cause the short-term integrator output to change rather drastically as compared with the long-term integrator level, which serves essentially as a reference level. A comparison is made in a percent change comparator which detects the percentage change of the short-term integrator level as compared with the long-term integrator level. This comparator is preset, for instance to 75 percent, so that when the short-term integrator level falls to 75 percent of the long-term integrator level an output will occur from the FM channel. The delay mentioned above in connection with the AM channel circuit is provided merely to make the output of the AM channel occur coincidentally with the output of the FM channel taking into account the fact that the latter is slower to respond because of the time constant of the short-term integrator. The outputs of both channels are ANDed together, and the output of this AND gate is used to provide suitable indication of an intrusion.

It is another object of the invention to provide an intrusion detector capable of distinguishing between certain cultural events while at the same time being substantially unresponsive to other cultural events. For instance, the present system is intended to discriminate against noises made by aircraft in the vicinity while at the same time remaining responsive to intrusions attributable to ground personnel or vehicles in the vicinity, such discrimination being based upon the combination of several characteristics. The use of simultaneous AM and FM detection in combination with an AGC amplifier having a long time constant provides a response capability which is especially insensitive to false alarms and which discriminates against types of noises which the system is intended to ignore. For instance if an aircraft, even a helicopter, approaches the system the FM channel will show a drop in the dominant frequency component and will therefore provide an output. However, because of the fact that the approach of the aircraft is gradual in most cases the AGC amplifier will reduce its gain as the aircraft approaches and therefore the AM channel will not detect any appreciable sudden increase in amplitude level, whereby the system will not respond to the aircraft. On the other hand, footsteps will cause the system to alarm because they provide both reduction in the dominant frequency detected by the geophone, and are sufficiently intermittent so that the AGC amplifier gain will not change appreciably as a result of the footsteps. Thus, both channels should respond with output sufficient to enable the AND gate to set off an alarm.

The range of frequencies to which the present system is sensitive includes approximately 10 to 100 Hz. Wind noise may provide a signal in the frequency range of 80 or 90 Hz, whereas vibrations caused by man-made noises tend to lie in the vicinity of 10 to 30 Hz. The geophone together with the AGC amplifier provides an output characteristic which rolls off at about 6db per octave above the natural frequency of the geophone. The time constant of the AGC amplifier is about 5 seconds, whereas the time constant of the delay circuit is about 0.2 second. The characteristic of the low-pass filter in the AM channel rolls off 24 db per octave.

An intrusion indication counter can provide any scale desired, and serves the purpose of preventing isolated events from setting off false alarms, such events including occasional claps of thunder, an object falling on the ground from a tree, etc.

Other objects and advantages of the invention will become apparent during the following discussion of the drawing, wherein:

DESCRIPTION OF PREFERRED EMBODIMENT

Figure 1:
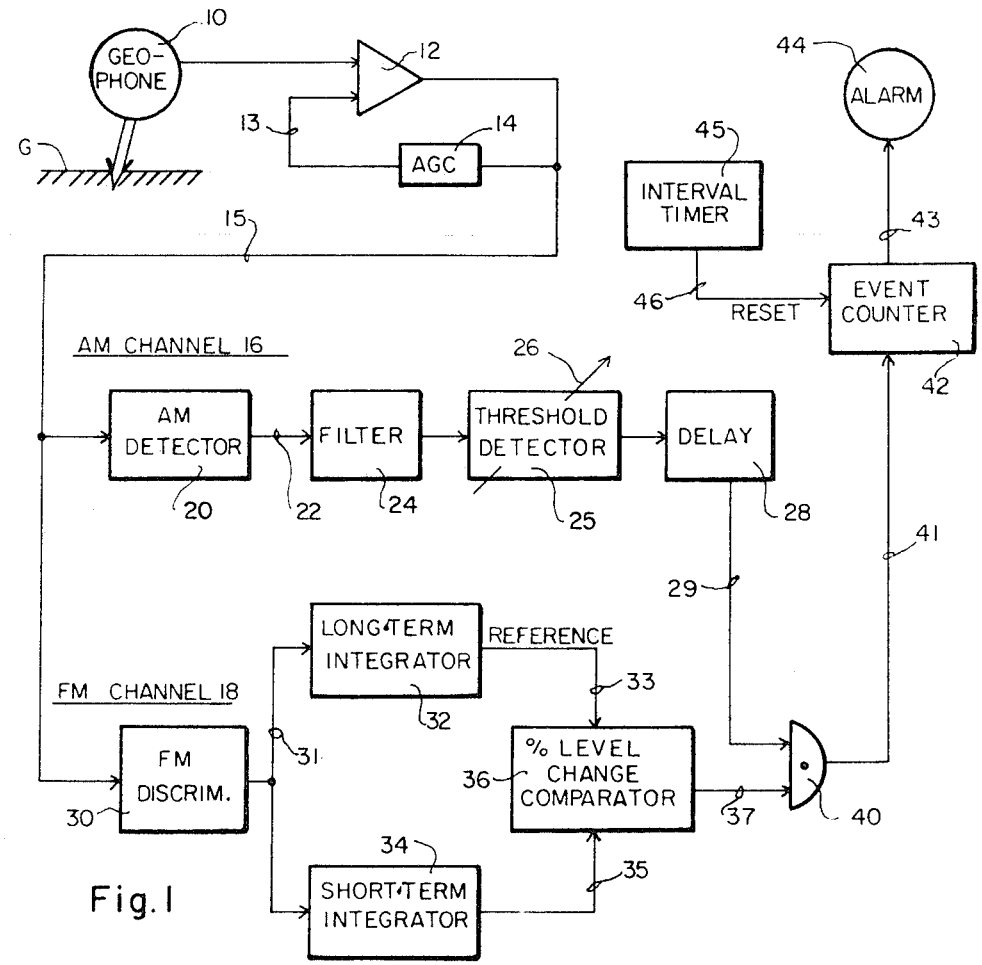
FIG. 1 is a block diagram of an illustrative embodiment of the system according to the present invention.

Referring now to the illustrative embodiment shown in FIG. 1, this embodiment uses both AM and FM techniques cooperating to distinguish between events which on the one hand are of natural environmental character and can therefore be considered to be ambient events, and which on the other hand include non-ambient events of a cultural or man-made character. Tests have indicated that the character of ambient background noise picked up by a vibration transducer is rather different from the character of man-made vibrations picked up by the same instrument, in the present illustrative embodiment comprising a geophone 10. The frequency spectrum for ambient background noise tends to be higher, mainly in the range of 50 to 100 Hz, whereas the frequency range for man-made events, such as persons walking in the vicinity or vehicles rumbling over the ground nearby tends to be lower, predominantly in the vicinity of 10 to 30 Hz. The range of frequencies mentioned above includes of course the frequency components to which the geophone 10 should be sensitive, higher frequencies being eliminated essentially by the response characteristics of the geophone itself and by subsequent filtering accomplished elsewhere in the system.

Figure 2:
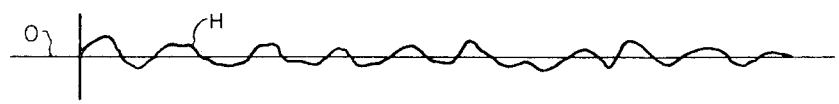
FIGS. 2 and 3 shows mutually related waveform diagrams in which the same environmental noise component is present in both diagrams but in FIG. 3 there are superimposed level lower frequency man-made components illustrated in dotted lines.
Figure 3:

FIG. 2 shows a typical ambient noise waveform in which higher frequency components H have a relatively large number of zero crossings. The average amplitude of the waveform in FIG. 2 is held relatively constant by the amplifier 12 which is controlled by an AGC feedback circuit 14 which has a time constant of at least a few seconds duration, typically 5. On the other hand, FIG. 3 shows the same noise waveform as in FIG. 2 when combined with several lower-frequency components L which are shown in the figure in dotted lines. It should be noted that the composite waveform of the higher frequency components H and the lower frequency components L, as shown by solid line in FIG. 3, crosses the zero axis O rather less frequently than the higher frequency components H shown by themselves in FIG. 2. The fact that the lower frequency components L displace the higher frequency components H away from the zero axis O in both directions reduces the number of zero axis crossings, so that the FM channel detects a lower dominant frequency whenever low-frequency cultural events are present.

In the illustrative embodiment of FIG. 1, the geophone 10 delivers seismic signals in the form of continuous waveform signatures to the high gain amplifier 12 whose gain is controlled by the AGC circuit 14, which takes an output signal from the amplifier 12 and delivers a long-time-constant control on wire 13 in an effort to keep the output level on wire 15 substantially constant on a long-time average basis. The AGC circuit 14 has a typical time constant of 5 seconds so that short-term variations in amplitude will be passed through the amplifier 12 to the AM channel 16 and to the FM channel 18 of the system. The output of the AGC amplifier 12 on wire 15 is delivered in the AM channel 16 to an AM detector which rectifies the waveform envelope and delivers a signal on wire 22 whose instantaneous amplitude is proportional to the signal on wire 15 except that it is rectified. This amplitude component is delivered by the wire 22 into a low-pass filter 24 designed to substnatially eliminate carrier components whose frequency exceeds about 6 cycles per second. The output of the filter 24 is delivered to an amplitude threshold detector circuit 25 whose threshold can be adjusted as indicated by the arrow 26 so that there will be an output from the threshold detector 25 only when its present threshold level is exceeded by the amplitude of the signal coming from the filter 24. Thus, in the absence of momentary amplitude levels exceeding the average level maintained by the AGC amplifier 12, there will be no output from the threshold detector 25. On the other hand, when seismic events occur which suddenly change the amplitude of the signal from the geophone 10, components of increased present amplitude will pass through the amplifier 12 whose time constant is too slow to permit its gain to change right-away, and therefore these components of increased amplitude will be detected by the AM detector, and if they are of sufficient magnitude, an output will occur from the threshold detector 25. The trailing edge of this output is delayed for a predetermined interval of time by the delay circuit 28 whose output on wire 29 enables the upper input of the AND gate 40 to which it is connected, as will be discussed hereinafter.

The signal appearing on wire 15 from the AGC amplifier 12 is also delivered to the FM channel 18, and is fed into the FM discriminator 30 whose output level on wire 31 comprises an instantaneously varying potential whose present level depends upon the dominant frequency component being detected at that instant by the FM discriminator 30. The output on wire 31 is coupled to two separate integrators respectively labelled 32 and 34. Both integrators include a storage means such as a capacitor. The long-term integrator 32 has a time constant of around 100 seconds, so that its instantaneous integrated level represents the averaged frequency of the incoming spectrum which has been detected over a relatively long time and can therefore be considered to comprise a rather stable reference potential level predominantly attributable to ambient noise conditions. On the other hand, the short-term integrator 34 includes an integrating circuit having a time constant of about 0.2 seconds, so that its current level is representative of recent dominant frequency components appearing in the output of the geophone 10 as averaged only over a relatively short time.

If recent events have included no outstanding changes in the dominant frequency being picked up by the geophone 10 both integrators 32 and 34 will have the same output potential levels appearing respectively on the wires 33 and 35. On the other hand, if an intrusion causes a sudden down-shift in frequency the voltage level on the wire 34 will differ substantially from the voltage level on the wire 33 assuming that the down-shift has lasted for a time sufficient to permit the short-term integrator 34 to follow it. Since integration is involved, the FM channel does not notice a shift in the dominant frequency of the signals on the wire 15 until they have persisted for a brief interval of time, and it is for this reason that the delay 28 is provided, so that when the FM channel does determine that there is a substantial shift in dominant frequency the output from the FM channel will coincide with the output from the AM channel as delayed by the delay circuit 28. The FM channel 18 delivers an output on wire 37 whenever the percent level-change comparator 36 notes that the voltage level appearing on wire 35 has changed from the reference level appearing on wire 33 by a percentage which exceeds the percentage for which the comparator 36 is preset. As mentioned above, this comparator might be preset to detect a change in which the level on wire 35 drops to 75 percent of the level on wire 33. In that event, an output will appear on the wire 37, and the wire 37 will enable the lower input to the AND gate 40. When both inputs to the AND gate 40 are simultaneously energized, an output will appear on the wire 41 which is connected to advance a counter 42, which serves to count the number of intrusion events signalled by the AND gate 40 to indicate simultaneous significant amplitude and frequency shifts.

The number of counts can be selected to require a certain number of non-ambient events before the alarm circuit 44 is actuated to sound an intrusion alarm. For instance, the counter 42 might be required to count to 4 unusual events before an output appears on wire 43 to initiate the alarm 44. If desired, the system can be further improved by providing a reset timer 45 which delivers a reset pulse on wire 46 at regular intervals to reset the counter. By this means, the predetermined number of events required to cause the counter 42 to overflow must all occur within the interval during which the timer 45 waits before issuing the next reset pulse on wire 46.

I do not limit the invention to the exact embodiment shown and described, for obviously changes may be made therein within the scope of the following claims, wherein:

I claim

1. In a system for detecting an intrusion into an area wherein both ambient noises and man-made noises are picked up by vibration transducer means and converted into electrical input signals including a spectrum of components representing the frequencies of said noises, the combination of:

a. AGC amplifier means connected to said transducer means and having a time constant which is long as compared with the period of the lowest input frequency to which the transducer means is responsive;

b. an AM signal channel connected to said amplifier means to receive amplified input signals and including means for detecting their amplitude levels, low-pass filter means coupled to receive the output of the detecting means and pass only frequencies below an arbitrarily selected highest man-made noise frequency, and threshold means connected to receive said filtered components and operative to deliver a first output each time the level of those components exceeds a preset amplitude level;

c. an FM signal channel connected to said amplifier means to receive amplified input signals and including FM discriminator means operative to deliver an analog potential whose level represents the dominant frequency component of the input signal, separate long-term and short-term integrator means both connected to the FM discriminator means to receive said analog potential and respectively delivering a long-term integrated level and a short-term integrated level, comparator means having separate inputs connected to the respective integrator means to receive said levels, the comparator means being responsive to a preset differential when present between said levels to deliver a second output; and d. AND gate means connected to receive said first and second outputs and responsive to the presence at the same time of both the first and the second output for delivering a signal indicating an intrusion.

2. In a combination as set forth in claim 1, delay means interposed in the AM signal channel for delaying its output by an amount of time substantially equal to the integrating time of the short-term integrator means, thereby to bring the outputs of the AM and FM channels into time coincidence when caused by the same input signal event.

* * * * *